United States Patent
Zargham et al.

(10) Patent No.: US 7,856,420 B2
(45) Date of Patent: Dec. 21, 2010

(54) ZERO LATENCY ENTERPRISE ENRICHED PUBLISH/SUBSCRIBE

(75) Inventors: Bahman Zargham, Sunnyvale, CA (US); Gregory Battas, Indianapolis, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2984 days.

(21) Appl. No.: 10/013,091

(22) Filed: Dec. 7, 2001

(65) Prior Publication Data
US 2002/0165903 A1 Nov. 7, 2002

Related U.S. Application Data

(60) Provisional application No. 60/285,640, filed on Apr. 19, 2001.

(51) Int. Cl.
G06F 7/00 (2006.01)
G06F 17/00 (2006.01)
(52) U.S. Cl. .................. 707/627; 707/628
(58) Field of Classification Search ............ 707/1, 707/101, 104.1, 600, 602, 608, 627, 628, 707/629; 705/37; 709/202; 717/103
See application file for complete search history.

(56) References Cited

U.S. PATENT DOCUMENTS

| | | | | |
|---|---|---|---|---|
| 6,058,389 A | * | 5/2000 | Chandra et al. | 707/1 |
| 6,487,548 B1 | * | 11/2002 | Leymann et al. | 707/628 |
| 6,954,757 B2 | * | 10/2005 | Zargham et al. | 1/1 |
| 2002/0013759 A1 | * | 1/2002 | Stewart et al. | 705/37 |
| 2002/0026630 A1 | * | 2/2002 | Schmidt et al. | 717/103 |

OTHER PUBLICATIONS

Jun-Jang Jeng, Josef Schiefer, and Henry Change (1994), An Agent-based Architecture for Analyzing Business Processes of Real-Time Enterprises, pp. 1-12.*
"TIBCO's Enterprise Application Integration Solutions,".

* cited by examiner

*Primary Examiner*—Don Wong
*Assistant Examiner*—Merilyn P Nguyen

(57) ABSTRACT

Solutions for reducing latencies in enterprise operations and business processes adaptation particularly as related to enriched publish and subscribe are proposed by the present invention. These solutions are implemented in a zero latency enterprise (ZLE) framework that allows the enterprise to integrate its services, applications and data in real time. Namely, an enterprise equipped to run as a ZLE is capable of integrating, in real time, its enterprise-wide data, applications, business transactions, operations and values. An operational data store operates as an information broker between the applications such that applications publish messages to the central repository and subscribe to messages from the central, rather than exchange request-response messages directly with each other. Thus, enriched publish and subscribe improves information synchronization between applications and reduce the number of request-response messages the applications would otherwise exchange. Consequently, an enterprise conducting its business as a ZLE exhibits superior management of its resources, operations and customer care.

16 Claims, 6 Drawing Sheets

FIG. 1 The ZLE framework

FIG. 3  The ZLE framework – built on Tuxedo / CORBA/Java technologies

ZERO LATENCY ENTERPRISE ENRICHED PUBLISH/SUBSCRIBE

REFERENCE TO PRIOR APPLICATION

This application claims the benefit of and incorporates by reference U.S. Provisional Application No. 60/285,640 filed Apr. 19, 2001.

CROSS REFERENCE TO RELATED APPLICATION

This application is related to and incorporates by reference U.S. Pat. 6,757,689, granted 29 Jun. 2004, entitled "Enabling a Zero Latency Enterprise," and U.S. Pat. 6,954,757, granted 11 Oct. 2005, entitled "Framework, Architecture, Method and System for Reducing Latency of Business Operations of an Enterprise."

BACKGROUND OF THE INVENTION

1. Field of the Invention

The present invention relates to an information technology (IT) infrastructure of an enterprise. More specifically, the present invention relates to an IT infrastructure that enables a zero latency enterprise (ZLE) through real time integration of enterprise services, business, processes, applications and data, and optimizes information exchange between enterprise applications.

2. Background Art

For maintaining the desired comprehensive view of their operations, organizations have to integrate their systems via their information technology (IT) infrastructure. IT infrastructures allow valuable information to be distributed across organizations to their groups of information consumers, including remote employees, business partners and customers.

When addressing their critical information technology needs, organizations often resort to new best-of-the-breed applications (or solutions) that supplement their legacy applications. In order to leverage their existing applications, organizations integrate their legacy applications with the new applications, a practice known as enterprise application integration (EAI). To this end, software vendors have responded by building tools, known as EAI products, alas different tools by different vendors, to automate the integration process.

With conventional solutions in place, organizations have been using some form of the EAI platform to integrate and exchange information between their applications. However, with substantial amounts of information located on disparate systems and platforms, information is not necessarily present in the desired form and place. Independent configuration for disparate industry standards and technologies makes systems integration requirements difficult to meet. The distinctive features of business applications that are tailored to suit the requirements of a particular domain complicate the integration even further. In addition, the new and legacy software applications are often incompatible and their ability to efficiently share information with each other is diminished.

Deficiencies in integration and data sharing are indeed a difficult problem of IT environments for any enterprise. When requiring information for a particular transaction flow that involves several distinct applications, the inability of organizations to operate as one-organ, rather than separate parts creates a challenge in information exchange and results in economic inefficiencies. Accordingly the present invention addresses these and related issues.

SUMMARY OF THE INVENTION

In accordance with the purpose of the invention, as embodied and broadly described herein, the invention provides enriched publish and subscribe operations in an IT infrastructure that allows an enterprise to run as a zero latency enterprise (ZLE). The enterprise experiences a plurality of events occurring in association with business transactions conducted at a plurality of sites across the enterprise. The IT infrastructure is configured with a ZLE framework having a hybrid functionality that allows the enterprise to integrate its services, business, processes, applications and data in real time. Namely, an enterprise equipped to run as a ZLE is capable of integrating, in real time, its enterprise-wide data, applications, business transactions, operations and values. An enterprise so equipped has a better capacity for responding to changes in the competition landscape and for adapting to changes in its business. Consequently, an enterprise conducting its business as a ZLE exhibits superior management of its resources, operations, supply chain and customer care.

This framework is not a single product or middle ware. Rather, it defines architecture with collection of products, tools, and services that enables, among others, the reduction of operational latencies in the enterprise. With such hybrid functionality, an enterprise running as a ZLE can route information across various enterprise applications using enterprise application integration technologies. Clearly, the ZLE framework is not just an enterprise integration platform as it can accomplish application and data integration across the enterprise. Using database extractors, database loaders and application adapters technologies, the ZLE framework can integrate data related to the real-time operations of an enterprise into a storage cache, also known as operational data store (ODS) or more precisely ZLE data store. Moreover, using these technologies, the ZLE framework can synchronize information across the enterprise using the enriched publish and subscribe operations supported by the ODS and enterprise application integration (EAI) tools. Also, any updates communicated (published) to the ZLE hub from any application across the enterprise can, via the ZLE hub, bring about information synchronization in all other applications across the enterprise, including its legacy applications. Information and updates thereof are communicated (published) from and received (subscribed) by the applications to the ZLE hub by way of adapters.

Accordingly, one embodiment of the present invention is a method for enriched publish and subscribe in an enterprise running as a zero latency enterprise (ZLE). The method includes initiating, in real time, a process responsive to an event associated with a business transaction. The process includes publish and subscribe operations. These operations include publishing to the ODS one or more messages prompted by that event. The messages contain information from that event. The ODS consolidates (or aggregates) respective information from the plurality of events. The ODS operates as an information broker between applications such that applications publish messages to the central repository and subscribe to messages from the central, rather than exchange request-response messages directly with each other. Accordingly, the aggregated information can, in real-time, be accessible and available for extraction and analysis from across the enterprise. The publish and subscribe operations further include updating the aggregated information with information from the published messages. These updates keep the information in the ODS up-to-date and, in addition, make the publish operations independent of subscriptions. This way, each application can publish and subscribe to the ODS independently of the other applications and yet enjoy the benefit of having access to the latest information. The publish and subscribe operations can additionally include enriching new messages with information from that event and/or corresponding information extracted from the central repository, and subscribing to the enriched new messages rather than the original message.

Another embodiment of the present invention is a computer readable medium embodying computer program code configured to cause a computer to perform steps for providing the enriched publish and subscribe in an enterprise running as a zero latency enterprise (ZLE). The steps can be analogous to the steps of the aforementioned method.

Yet another embodiment of the present invention is a system for enriched publish and subscribe operations associated with business transactions conducted by the enterprise running as a zero latency enterprise (ZLE). The system is implemented in a ZLE framework and includes one or more applications via which the business transactions are conducted; and an operational data store (ODS). The ODS is operatively communicative with applications such that the applications are capable to publish messages to and subscribe to messages from the ODS. As noted, the ODS is configured to operate as a dynamic central repository that consolidates information from across the enterprise and supports business transactional access to real time information from any of the one or more applications. Accordingly, the ODS is configured to know what particular information any one of the applications needs in order to accomplish its task, the particular information enriching messages to which the applications subscribe. The ODS is further configured to update the consolidated information with information from messages published by the applications.

In another embodiment the foregoing system includes a ZLE enriched publish-subscribe service provider module that is associated with the ODS and to which each one of applications can register with its predefined schema. The schema identifying which of a plurality of events associated with the business transactions and which types of data changes its respective application is interested in, the schema further identifying the particular information needed by its respective application.

Thus, enriched publish and subscribe improves information synchronization between applications and reduce the number of request-response messages the applications would otherwise exchange. Indeed, a result of the foregoing features, for a particular number (N) of applications, a combined number of the published and subscribed messages can be reduced from twice that particular number (2N) to a total number of 4 or 5 messages.

BRIEF DESCRIPTION OF THE DRAWINGS

The accompanying drawings, which are incorporated in and constitute a part of this specification, illustrate several embodiments of the invention and together with the description, serve to explain the principles of the invention. Wherever convenient, the same reference numbers will be used throughout the drawings to refer to the same or like elements.

DETAILED DESCRIPTION OF THE INVENTION

Figure 1:
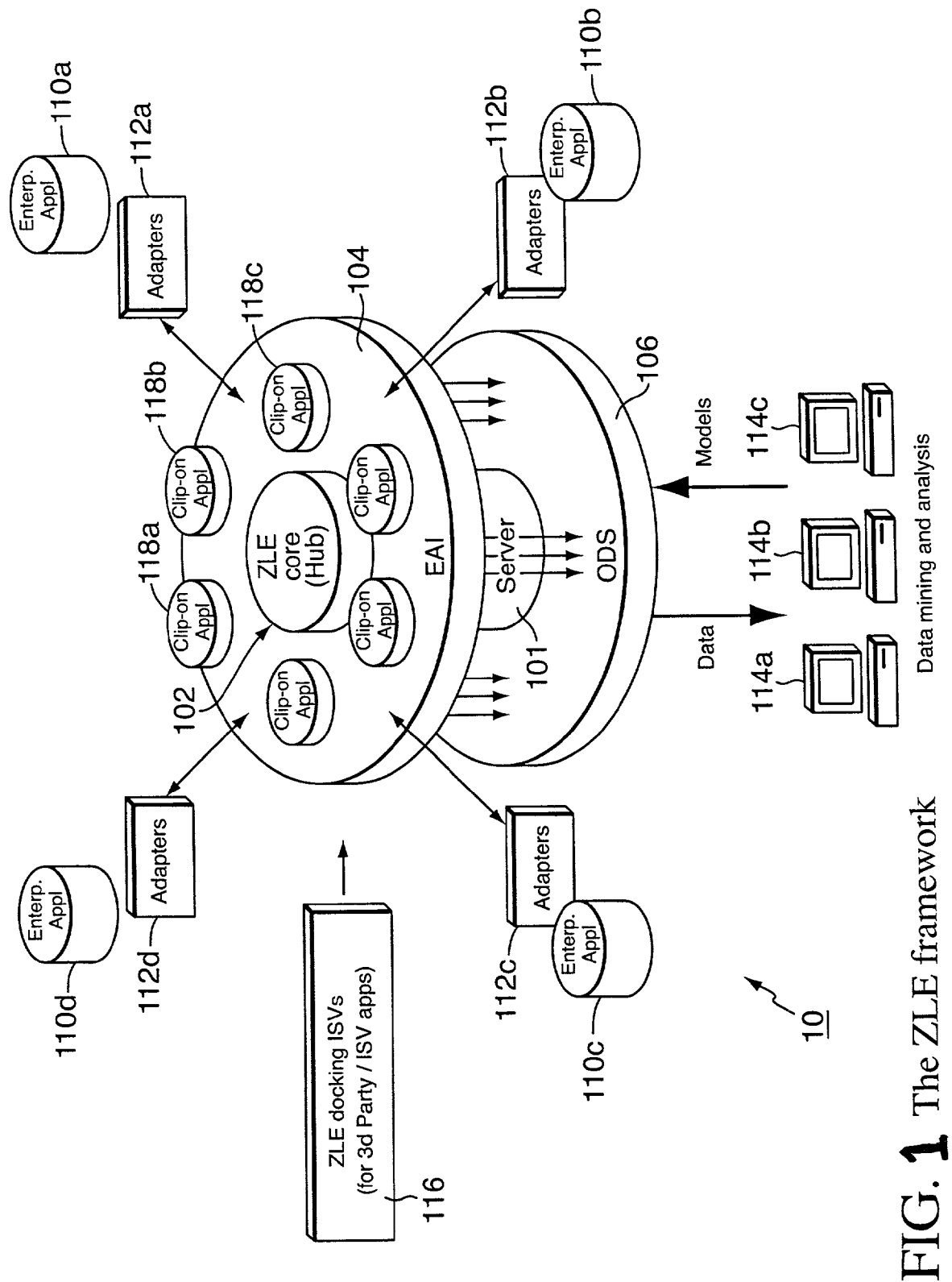
FIG. 1 illustrates a ZLE framework that defines, in the preferred embodiment, a multilevel architecture (ZLE architecture) centered on a virtual hub.

The present invention provides a zero latency enterprise (ZLE) enriched publish and subscribe that results in a more efficient message store function and exchange of information among applications. Founded on the ZLE framework concept, as described in the aforementioned co-pending related applications (Ser. Nos. 09/948,928 and 09/948,927, respectively), the ZLE-enriched publish and subscribe involves an optimization scheme for decreasing the inter-applications data query and messages transmission load. As a preferred functional and architectural strategy, the present invention will be embodied in the ZLE framework. Namely, the ZLE-enriched publish and subscribe is implemented as part of the scheme for reducing latencies in enterprise operations. This scheme enables the enterprise to integrate its services, business rules, business processes, applications and data in real time. In other words, it enables the enterprise to run as a ZLE.

To enable one of ordinary skill in the art to make and use the invention, the description of the invention is presented herein in the context of a patent application and its requirements. Although the invention will be described in accordance with the shown embodiments, one of ordinary skill in the art will readily recognize that there could be variations to the embodiments and those variations would be within the scope and spirit of the invention.

The meaning imparted to the terms below and throughout this paper is intended not as a limitation but merely to convey character or property relevant to the present invention. Where the terms have a special meaning or a meaning that is inapposite to accepted meaning in the art, the value of such meaning is not intended to be sacrificed to well-worn phrases or terms.

Publish and Subscribe—respectively, refers to pushing data into and pulling data out of a system or system module. Pushing data involves for example any one or a combination of allocating, writing, inserting and saving data. Pulling data involves for example any or a combination of selecting, requesting, reading, and extracting data. Puling and pushing data may additionally involve sending and/or receiving the data by means of messages.

Enterprise—refers to any organization, including a business organization, its subsidiaries, departments, divisions, sections, sectors, groups, branches, channels or like parts; and it can include any partners, affiliates and associates of the organization. An organization includes its resources such as one or more people, systems, databases, policies and more.

Enterprise-wide or across the enterprise—refers, depending on the context, to anywhere within or about the enterprise, in all parts of the enterprise, all over the enterprise, all around the enterprise, across all enterprise products, services, and channels, between any sites of or associated with the enterprise, or at any site of or associated with the enterprise.

Extensible—refers to any one or the combination of scalable, extendable and expandable. Scalability relates to size, extendibility relates to volume and expandability relates to capacity. For example, the ZLE framework and architecture are extensible. With the ZLE framework and architecture, an enterprise is also extensible.

Scalable—refers to the ability to improve performance by extending the size of an enterprise, a system or an element thereof. Scalability of an enterprise enables it to run as a virtual enterprise (i.e., performing the functions of an entity beyond what is really there). For example, scalability allows an enterprise with exhausted manufacturing capacity to push production overflows to its partners or affiliates. Namely, running as a virtual enterprise, the enterprise can extend its existing capacity through manufacturing-on-demand by its business partners; and the partners have visibility to the enterprise so that they can stay informed and be prepared to respond. Scalability of a system involves adding components to the system. Scalability of the system allows sizing it for better performance when the volume of transactions increases.

Available—refers generally to an enterprise or system 'being there' even in the face of failure or absence of a part thereof. For example, an enterprise is available when it continues to conduct its business unimpeded even if a part of the enterprise is shut down. A system is available when it continues processing transactions even if it suffers a component failure Real-time—refers to immediately or almost immediately; or the actual time, nearly the actual time or within seconds from the actual time during which an event or a process transpires, or pertains to the performance of a computation or other action nearly or at the actual time of a related event or process so as to render an instantaneous, up-to-the-second or up-to-the-minute result therefrom.

Zero Latency—refers to real-time or substantially real time. In terms of a system, zero latency is substantially no delay between the desired and actual response time (no unplanned latency). In the context of an enterprise, zero latency is about real-time or near real-time operations, processing and application of information to achieve a competitive advantage, hence the term zero-latency enterprise (ZLE). As will become evident from the description herein, in the context of the present invention, the term 'ZLE' defines a broader term than the conventional ZLE term. And, to properly distinguish it from the conventional term, one might use the term Compaq ZLE™ (the present invention was developed at Compaq Computer Corporation in Houston Texas). However, to simplify the discussion herein, the term 'ZLE' is used instead.

Coherent view—refers to substantial congruity of the views from any part of the enterprise, or an enterprise-wide view of information, such as data, business transactions and their status, as well as an historic account thereof, that is consistent throughout the enterprise regardless from where in the enterprise the view is obtained. The View of information can include access for loads, extractions and queries.

Loosely coupled applications—refers to applications that can function as stand-alone applications and that when integrated with the ZLE framework are operationally independent and not relying on each other for obtaining information although they can share that information. The information is accessible by the loosely coupled applications from a shared operational data store (ODS) so that data dependencies between requesting and responding applications are removed.

Tightly coupled applications—refers to applications that are not stand-alone and are tightly integrated into the ZLE framework. Tightly integrated functionality—e.g., event capture, data extraction, rules, workflow, message transports and transformations—becomes part of the ZLE core functionality.

Docking—refers to interfacing, integrating or adding (e.g., adding applications or solutions that extend the IT infrastructure functionality and, in turn, that of the enterprise).

Bulk data—refers to data in mass or at least in a cluster or block.

Customer—referred to also as consumer, client, visitor or guest, is any entity, individual, or organization that can receive and consume a value. In a system sense, a customer can be another system or application (e.g., an enterprise application is an 'end-customer' of the ZLE core as will be explained below).

Value-refers to any service, item for consumption, resource, product, creation, knowledge, information, action, etc. produced by or in association with the enterprise, internally or externally. A value is typically produced for the benefit of the customer.

Business—refers to any character, undertaking or functionality of an organization, be it a commercial business or any other type of organization (e.g., a commercial conglomerate, global charitable organization, governmental agency, military organization, a local agency, such as law enforcement or emergency response, with affiliation to other local agencies, and more).

Business transaction—refers to any operation or process associated with the business. A business transaction can be one or a series of business transactions, discrete or related to each other. A business transaction can be single or multi-phased, short or ongoing.

Event—refers, depending on the context, to an event occurring anywhere across the enterprise in the course of conducting the business of the enterprise or an event occurring in any part of the IT infrastructure of the enterprise upon commencement, in response to, during or after completion of a business transaction. One type of event can produce the other or can occur in combination with the other. Namely, an event can be any commencement or completion of a business transaction, any state change of a business transaction, any data entry or data change associated with the business or business transaction, any inquiry or outcome associated with a business transaction and more. An event may produce a result, and the result, if any, may itself be an event. An event may unlock or prompt the commencement of one or more business transactions. An event may lock or prompt the ending of one or more business transactions. The locking or unlocking may also be events. An event may be a single occurrence or a series of events. Several examples can be provided to illustrate the above. In one example, an event can be a customer providing a new address or a 'yes' answer to a query about a new address. In a second example, an event and a result, which is a 'notable' event, can be the recording of a new prescription at a local pharmacy and prompting notification about a new drug interaction related to the prescription from somewhere else. A third example of an event involves an on-line order of a gift certificate somewhere in the country for a recipient that opened a gift registry account in a store somewhere else. In a fourth example involving a series of events a disaster alert is followed by hazardous chemicals data associated therewith. A fifth example involving a series of events can be an attempt to return merchandise almost immediately followed by a fraud alert or a credit status change. Finally, in a sixth example an event can be an inventory-level change for an item in a warehouse or production shop.

Indicia—refers to any detectable thing associated with an event, including any information related to the event. The information can contain or is generated from one or a combination of data, transaction state(s), look-up data (an historic account) and the like. It is noted that the occurrence of an event can be detected by capturing the indicia of its occurrence.

Transaction—refers to a collection of operations on the state of an application. A transaction is typically triggered by a request, time out or input message that prompts an operation. A transaction trigger may include one or any combination of event, condition and action resulting from the transaction (operation). An action can itself be an event or a cascade of events.

Application—refers to a program or software embodied in a computer readable medium and including computer readable program-code that causes a computer to perform a certain task. An application can spawn a transaction, and preferably a plurality of concurrent transactions.

Figure 3:
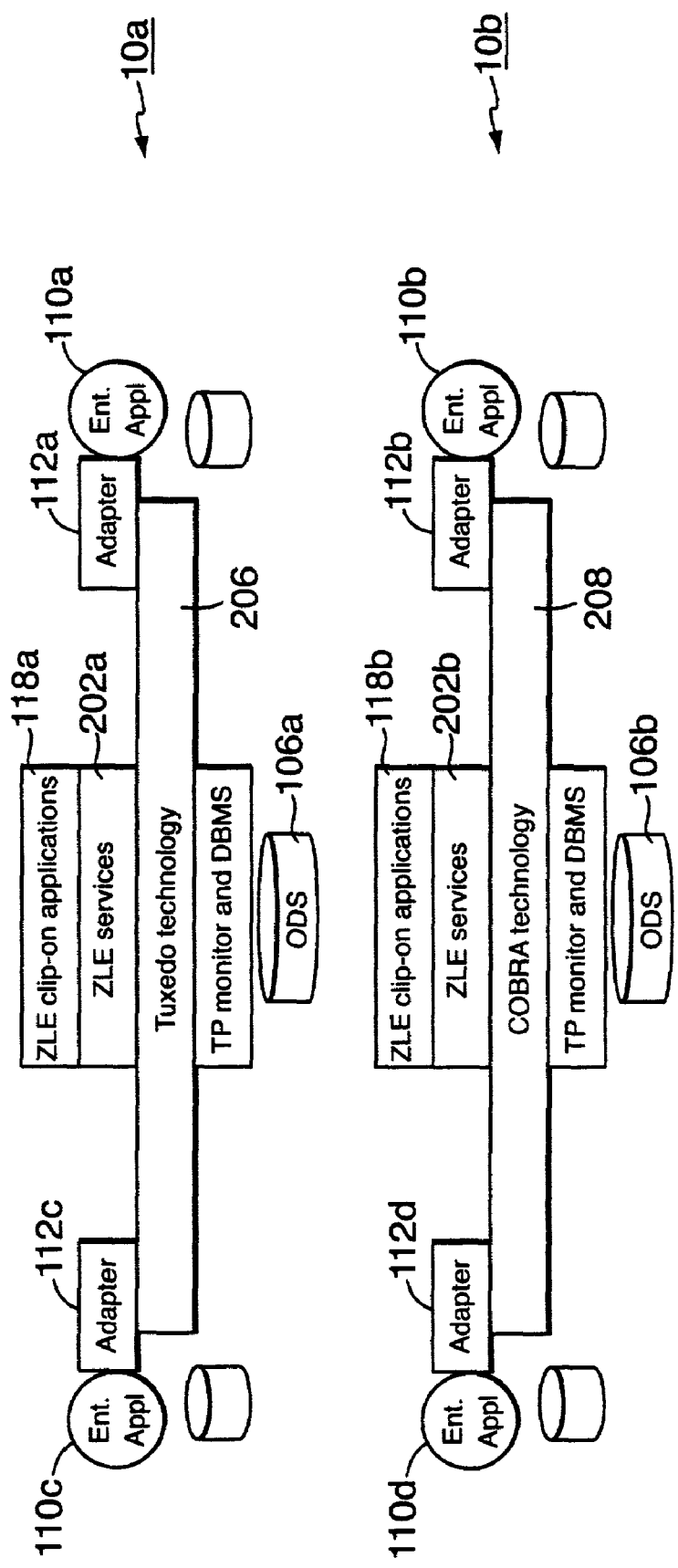
FIG. 3 illustrates a ZLE framework with a different application server supporting the ZLE core services that can be based on Tuxedo, CORBA or Java technologies.

Services—refers to, in one sense, to enterprise services provided in the course of conducting the enterprise business (See, e.g., FIG. 3 which describes a commercial business with its associated service connections). In terms of the IT infrastructure, the term 'services' refers to any applications that enable the enterprise to run as a ZLE by adding functionality to the IT infrastructure. In the context of the ZLE architecture 'services' can be one or any combination of applications that provide integration services, ZLE native services, core ISV services (ISV-independent solution providers), unified rules services, workflow services, message transformation services, extraction, transformation and load (ETL) service and the like. 'ZLE services' are core services and capabilities, where core services include native services and core ISV services. Loosely coupled applications can be consumers or clients of such services.

Central repository—refers to a sharable unified capacity such as the operational data store (ODS) or ZLE data store with a relational database management system (RDBMS) in the ZLE framework as defined herein. Although a central repository can be in a single physical device or located in a single physical location, the central repository may be configured in a distributed storage system that is nonetheless accessible from across the enterprise.

As mentioned, the present invention is preferably embodied in a ZLE framework. The ZLE framework as described in the aforementioned co-pending related applications was developed at Compaq Computer Corporation of Houston Texas. Although it would be more accurate to use the term Compaq ZLE™, the term ZLE is used instead for simplicity. For further simplicity, a ZLE enterprise equipped with IT infrastructure configured in accordance with the present invention is referred to in short as ZLE or enterprise running as a ZLE.

Overview of the ZLE Concept, Framework and Architecture

The ZLE Concept

In integrating e-commerce into their business models enterprises have had to deal with the shortcomings of latencies in their operations, including their interaction with and responses to consumers. This reality prompted the proposed solutions for reducing latencies. Zero latency allows an enterprise to achieve coherent operations, efficient economics and competitive advantage.

Notably, what is true for a single system is also true for an enterprise—reduce latency to zero and you have an instant response. An enterprise running as a ZLE, can achieve enterprisewide recognition and capturing of business events that can immediately trigger appropriate actions across all other parts of the enterprise and beyond. Along the way, the enterprise can gain real-time access to a real-time, consolidated view of the its operations and data from anywhere across the enterprise. As a result, the enterprise can apply business rules and policies consistently across the enterprise including all its products, services, and customer interaction channels. As a further result, the entire enterprise can reduce or eliminate operational inconsistencies, and become more responsive and competitive via a unified, up-to-the-second view of customer interactions with any part(s) of the enterprise, their transactions, and their behavior. Moreover an enterprise running as a ZLE and using its feedback mechanism can conduct instant, personalized marketing scored and fine-tuned in real time while the customer is engaged. This result is possible because of the real-time access to the customer's profile and enterprise-wide rules and policies (while interacting with the customer). What is more, an enterprise running as a ZLE achieves faster time to market for new products and services, reduced exposure to fraud, customer attrition, and other business risks. In addition, an enterprise running as a ZLE has the tools for managing its rapidly evolving resources (e.g., workforce) and business processes.

The ZLE Framework and Architecture

To become a zero latency enterprise, an enterprise integrates, in real time, its busines processes, applications, data and services. Zero latency involves real-time recognition of business events, and simultaneously synchronizing and routing information related to such events across the enterprise. As a means to that end, the aforementioned enterprise-wide integration for enabling the ZLE is implemented in a framework, the ZLE framework. FIG. 1 illustrates a ZLE framework.

As shown, the ZLE framework 10 defines a multilevel architecture, the ZLE architecture. This multilevel architecture provides much more than an integration platform with enterprise application integration (EAI) technologies, although it integrates applications and data across an enterprise; and it provides more comprehensive functionality than mere real time data warehousing, although it supports data marts and business intelligence functions. As a basic strategy, the ZLE framework is fashioned with hybrid functionality for synchronizing, routing, and caching, related data and business intelligence and for transacting enterprise business in real time. With this functionality it is possible to conduct live transactions against the ODS. For instance, the ZLE framework aggregates data through an operational data store (ODS) 106 and, backed by the ODS, the ZLE framework integrates applications, propagates events and routes information across the applications through the EAI 104. In addition, the ZLE framework executes transactions in a server 101 backed by the ODS 106 and enables integration of new applications via the EAI 104 backed by the ODS 106. Furthermore, the ZLE framework supports its feedback functionality via the data mining and analysis 114 and reporting mechanism (which are also backed by the ODS). Advantageously, the ZLE framework 10 is extensible in order to allow new capabilities and services to be added. Thus, the ZLE framework enables coherent operations and reduction of operational latencies in the enterprise.

The preferred ZLE framework 10 defines a ZLE architecture that serves as a robust system platform capable of providing the processing performance, extensibility, and availability appropriate for a business-critical operational system. The multilevel ZLE architecture is centered on a virtual hub, called the ZLE core (or ZLE hub) 102. The enterprise data caching functionality (ODS) 106 of the ZLE core 102 is depicted on the bottom and its EAI functionality 104 is depicted on the top. Data mining and analysis applications 114 pull data from the ODS 106 at ZLE core 102 and contribute result models to it. The result models can be used to drive new business rules, actions, and so on. Although the data mining and analysis applications 114 are shown residing with systems external to the ZLE core, they can alternatively reside with the ZLE core 102. Clip-on applications 108 are tightly coupled to the ZLE core 102 residing on top of the ZLE core and directly accessing its services. Enterprise applications 110, such as SAP's enterprise resource planing (ERP) application or Siebel's customer relations management (CRM) application, are loosely coupled to the ZLE core (or hub) 102 being logically arranged around the ZLE core and interfacing with it via application or technology adapters 112. The docking of ISV (independent solution vendors) solutions such as the enterprise applications 110 is made possible with the ZLE docking 116 capability. The ZLE framework's open architecture enables core services and plug-in applications to be based on best-of-breed solutions from leading ISVs. This, in turn, ensures the strongest possible support for the full range of data, messaging, and hybrid demands.

The ZLE Core

The ZLE core is a virtual hub for various specialized applications that can clip on to it and are served by its native services. Any specialized applications -including those that provide new kinds of solutions that depend on ZLE services- can clip on to the ZLE core. The ZLE core is also a hub for data mining and analysis applications that draw data from and feed resultmodels back to the ZLE core. Indeed, the ZLE framework combines the EAI, ODS, OLTP (online transaction processing), data mining and analysis, automatic modeling and feedback, thus forming the touchstone hybrid functionality of every ZLE framework. To this functionality others can be added including the functionality of native and core ISV services and of clip-on and enterprise applications. Moreover, the ZLE core enables an array of enterprise applications (third party application) to interface to and become part of the ZLE framework.

The ZLE core components include an ODS acting as a central repository with clusteraware RDBMS functionality, a transactions application server acting as a robust hosting environment for integration services and clip-on applications, and core services. These components are not only integrated, but the ZLE core is designed to derive maximum synergy from this integration. Furthermore, the services at the core of ZLE optimize the ability to integrate tightly with and leverage the ZLE architecture, enabling a best-of-breed strategy. They contribute essential ZLE services that enable a true Compaq ZLE™.

It is noted that Compaq®, Compaq ZLE™, AlphaServer™, Himalaya™, NonStop™, and the Compaq logo, are trademarks of Compaq Computer Corporation of Houston, Texas. True64™ is a trademark of Compaq information Technologies Group, L.P., and UNIX® is a trademark of the Open Group. Any other product names may the trademarks of their respective originators.

ZLE Core Services

Figure 2:
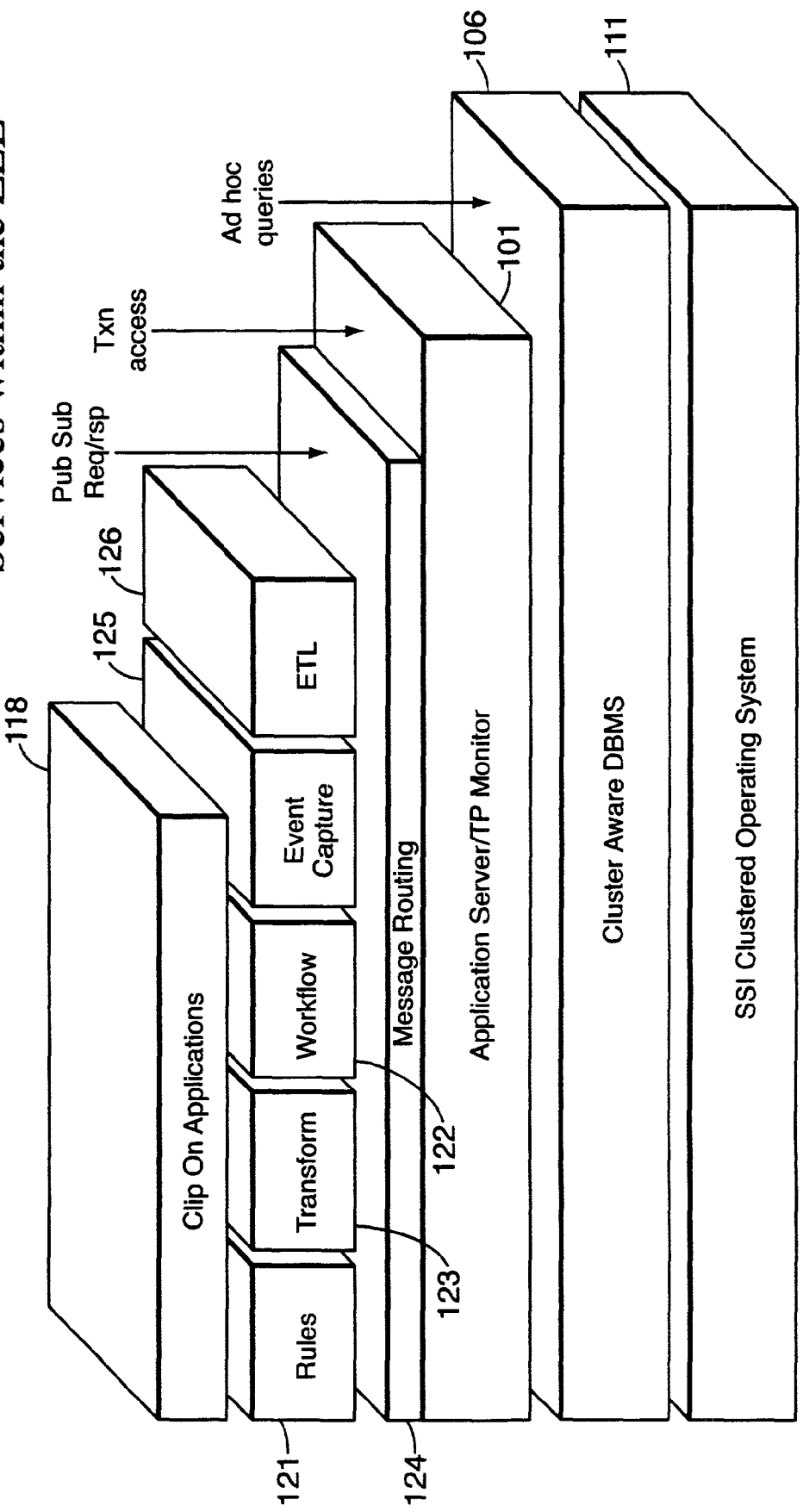
FIG. 2 illustrates the core of the ZLE framework.

At the ZLE core of the ZLE framework resides a set of ZLE service—i.e., core services and capabilities—as shown in FIGS. 2 and 3. The core services 202 can be fashioned as native services and core ISV services (ISVs are third-party enterprise software vendors). The ZLE services (121-126) are preferably built on top of an application server environment founded on Tuxedo 206, CORBA 208 or Java technologies (CORBA stands for common object request broker architecture). The broad range of core services includes business rules, message transformation, workflow, and bulk data extraction services; and, many of them are derived from best-of-breed core ISVs services provided by Compaq, the originator of the ZLE framework, or its ISVs.

Among these core services, the rules service (121) is provided for event-driven enterprise-wide business rules and policies creation, analysis and enforcement. The rules service enables writing business rules using graphical user interface or syntax like a declarative, English-language sentence. Additionally, the rules service is designed to find and apply the most applicable business rule upon the occurrence of an event. Based on that the rules service is designed to arrive at the desired data (or answer) which is uniform throughout the entire enterprise. Hence this service may be referred to as the uniform rules service. This service allows the ZLE framework to provide a uniform rule-driven environment for flow of information and supports its feedback mechanism. The rules service can be used by the other services within the ZLE core, and any clip-on and enterprise applications that an enterprise may add, for providing enterprise-wide uniform treatment of business rules and transactions based on enterprise-wide uniform rules.

The extraction, transformation, and load (ETL) service (126) enables large volumes of data to be transformed and moved quickly and reliably in and out of the database (often across databases and platform boundaries). The data is moved for use by analysis or operational systems as well as by clip-on applications.

The message transformation service (123) maps differences in message syntax, semantics, and values, and it assimilates diverse data from multiple diverse sources for distribution to multiple diverse destinations. The message transformation service enables content transformation and content-based routing, thus reducing the time, cost, and effort associated with building and maintaining application interfaces.

The workflow (process flow) service 122 is provided for supporting global business transactions across multiple systems, and for mapping and controlling the flow of short or long term business transactions across the enterprise. The workflow (or process-flow) service manages the flow of business transactions and processes between multiple systems and applications that are integrated via the ZLE framework and may take only seconds or up to days to execute. This entails monitoring and managing ongoing transactions as well as ensuring the correct flow of business transactions. The workflow service leverages the state engine capabilities of the ZLE core database to track the state of the transaction—and provide visibility into its progress—over the ensuing hours, days, and weeks it takes to run its course.

The parallel message router and inserter service (124) is provided for high performance, high-volume routing, and insertion of transaction event data into the ODS and other ZLE services and applications. Message routing may involve the rules and workflow services of the ZLE core. These services may intervene to determine where particular messages are to be routed based on content and predefined workflow process. A powerful message routing and insertion capability is designed for routing high volumes of messages through the ZLE architecture. To propagate high volumes of messages to the database and elsewhere within the ZLE framework, the router and inserter function leverages the parallelism of the ZLE platform. This capability can further include content-based routing and use of the ODS as a database management system that can store transactions in SQL tables and as a centralized message store and queuing system for efficient publish/subscribe message distribution. Constantly refreshed information, such as stock prices or data on inventory levels, can be inserted into the ODS and then published to the appropriate subscriber.

Essentially, this message routing and insertion capability is routing between the internal components of the ZLE core. Hence, although the ZLE framework supports message oriented middleware (MOM), this capability differs from the functionality of routing and queuing systems that move messages from application to application.

Transaction Processing

Fundamentally, the ZLE framework includes elements that are modeled after a transaction processing (TP) system. In broad terms, a TP system includes application execution and transaction processing capability, one or more databases, tools and utilities, networking functionality, an operating system and a collection of services that include TP monitoring. A key component of any TP system is a server. The server is capable of parallel processing, and it supports concurrent TP, TP monitoring and management of transactions-flow through the TP system. The application server environment advantageously can provide a common, standardbased framework for interfacing with the various ZLE services and applications as well as ensuring transactional integrity and system performance (including scalability and availability of services). Thus, the ZLE services (121-126) are executed on a server, preferably a clustered server platforms 101 such as the Compaq NonStop™ Himalaya™ server or the Compaq AlphaServer™ server running the Tru64™ UNIX operating system 111 (The Compaq servers are developed by Compaq Computer Corporation of Houston Tex.). The Compaq clustered server platforms 101 provide the parallel performance, extensibility (e.g., scalability), and availability requisite for business-critical operations.

Clip-on Applications

Clip-on applications 118, literally clip on to, or are tightly coupled with, the ZLE core 102. They are not standalone applications in that they require the substructure of the ZLE core and its services (e.g., native core services) in order to deliver highly focused, business-level functionality of the enterprise. Clip-on applications provide business-level functionality that leverages the ZLE core's real-time environment and application integration capabilities and customizes it for specific purposes. ISVs (such as Trillium, Recognition Systems, and MicroStrategy) as well as the originator of the ZLE framework (Compaq Computer Corporation) can contribute value-added clip-on applications such as for fraud detection, customer interaction and personalization, customer data management, narrowcasting notable events, and so on. A major benefit of clip-on applications is that they enable enterprises to supplement or update its ZLE core native or core ISV services by quickly implementing new services. Examples of clip-on applications include interaction manager, narrowcaster, campaign manager, customer data manager, and more. The following describes these examples in some detail.

The interaction manager application (by Compaq Computer Corporation) leverages the rules engine 121 within the ZLE core to define complex rules governing customer interactions across multiple channels. The Interaction manager also adds a real-time capability for inserting and tracking each customer transaction as it occurs so that relevant values and more can be offered to consumers based on real-time information.

The narrowcaster application preferably uses MicroStrategy software that runs against the relational database of the ODS in order to notify a notable event (hence it is also called notification application). Notable events are detected within the ZLE framework in real-time. Then, sharing data (in the ODS) that the interaction manager and rules engine have used to assert the notable event, the narrowcaster selectively disseminates a notification related to such events. The notification is narrowcasted rather than broadcasted (i.e., selectively disseminates) to terminals, phones, pagers, and so on of specific systems, individuals or entities in or associated with the enterprise.

The campaign manager application can operate in a recognition system such as the data mining and analysis system (114, FIG. 1) to leverage the huge volumes of constantly refreshed data in the ODS of the ZLE core. The campaign manger directs and fine-tunes campaigns in real time based on real-time information gathered in the ODS.

The customer data manager application leverages customer data management software to synchronize, delete, duplicate and cleanse customer information across legacy systems and the ODS at the ZLE core in order to create a unified and correct customer view.

Extending ZLE via Enterprise Applications and Adapters

The ZLE core architecture is designed to evolve with changes in the business environment of the enterprise. Enterprise applications (typically specialized ISV solutions), such as PeopleSoft, SAP's ERP or Siebel's CRM applications, can "dock" on the ZLE core via adapters. The adapters enable normalized messaging for exchanges among standard applications (such as SAP, PeopleSoft, popular Web server applications, and so on) as well as exchanges with custom applications. There are other architectural and functional requirements that the adapters support, including allowing, for example, legacy environments and diverse databases to join the ZLE framework.

Enterprise applications are loosely coupled to the ZLE core, the clip-on applications and other third party enterprise application (or ISV solutions). When so interfaced, an enterprise application becomes a logical part of the ZLE framework and shares that data with all the other applications through its ZLE data store (ODS). Enterprise applications differ from the tightly coupled clip-on applications in that they can stand alone, without the benefit of the ZLE framework. However, their value to the enterprise is increased immensely by integration with the ZLE framework. In some cases, these applications are the "end-consumers" of the ZLE architecture. In others, they provide much of its fodder in the form of information and specialized procedures of the enterprise. Typically, as enterprise applications integrate or interface via the ZLE framework with other applications and systems across the enterprise they play both roles—i.e., taking and providing information in real time. Notably, the information applications take and provide is centrally warehoused in the ODS, more details of which are hereafter provided.

ODS with Cluster-aware RDBMS Functionality

The ODS with its relational database management system (RDBMS) functionality is integral to the ZLE core and central to achieving the hybrid functionality of the ZLE framework (106 FIG. 1). The ODS 106 provides the mechanism for dynamically integrating data into the central repository or data store for data mining and analysis, and it includes the cluster-aware RDBMS functionality for handling periodic queries and for providing message store functionality and the functionality of a state engine. Being based on a scalable database, the ODS is capable of performing a mixed work-load. The ODS consolidates data from across the enterprise in real time and supports transactional access to up-to-the-second data from multiple systems and applications, including making real-time data available to data marts and business intelligence applications for real-time analysis and feedback. For the purpose of publish and subscribe as will be further detailed below, the ODS is managed using database extractors and database loaders technologies.

As part of this scheme, the RDBMS is optimized for massive real-time transaction and loads, real-time queries, and batch-extraction. The cluster-aware RDBMS is able to support the functions of an ODS containing current-valued, subject-oriented, and integrated data reflecting the current state of the systems that feed it. As mentioned, the preferred RDBMS can also function as a message store and a state engine, maintaining information as long as required for access to historical data. It is emphasized that ODS is a dynamic data store and the RDBMS is optimized to support the function of a dynamic ODS.

The cluster-aware RDBMS component of the ZLE core is, in this embodiment, either the NonStoP™ SQL database running on the NonStop™ Himalaya™ platform or Oracle Parallel Server running on the Tru64 UNIX AlphaServer™ system. In supporting its ODS role of realtime enterprise data cache, the RDBMS contains preferably three types of information: state data, event data and lookup data. State data includes transaction state data or current value information such as a customer's current account balance. Event data includes detailed transaction or interaction level data, such as call records, credit card transactions, Internet or wireless interactions, and so on. Lookup data includes data not modified by transactions or interactions at this instant (i.e., an historic account of prior activity).

Overall, the RDBMS is optimized for application integration as well as real-time transactional data access and updates and queries for business intelligence and analysis. For example, a customer record in the ODS (RDBMS) might be indexed by customer ID (rather than by time, as in a data warehouse) for easy access to a complete customer view. In this embodiment, key functions of the RDBMS includes dynamic data caching, historical or memory data caching, robust message storage, state engine and real-time data warehousing.

The state engine functionality allows the RDBMS to maintain real-time synchronization with the business transactions of the enterprise. The RDBMS state engine function supports workflow management and allows tracking the state of ongoing transactions (such as where a customer's order stands in the shipping process) and so on.

The real-time data warehousing function of the RDBMS supports the real-time data warehousing function of the ODS. This function can be used to provide data to data marts and to data mining and analysis applications.

The dynamic data caching function aggregates, caches and allows real-time access to real-time state data, event data and lookup data from across the enterprise. Advantageously, this function, for example, obviates the need for contacting individual information sources or production systems throughout the enterprise in order to obtain this information. As a result, this function greatly enhances the performance of the ZLE framework.

The historical data caching function allows the ODS to also supply a historic account of events that can be used by newly added enterprise applications (or clip-on applications). Typically, the history is measured in months rather than years. The historical data is used for enterprise-critical operations including for transaction recommendations based on customer behavior history.

The state engine functionality allows the RDBMS to maintain real-time synchronization with the business transactions of the enterprise. The state engine function supports workflow management and allows tracking the state of ongoing transactions (such as where a customer's order stands in the shipping process) and so on.

The robust message store function supports the EAI platform for ZLE core-based publish and subscribe operations. Messaging functions in the ZLE framework may involve a simple messaging scenario of an EAI-type request-response situation in which a call-center application requests information on a particular customer from a remote billing application. The call-center application issues a Tuxedo or corba call that the transformation service in the ZLE core maps to a Tuxedo call for communicating with the remote application. Billing information flows back to the call center through a messaging infrastructure. Performing publish and subscribe through the relational database enables the messaging function to leverage the parallelism, partitioning, and built-in manageability of the RDBMS platform. This platform supports priority, first-in/first-out, guaranteed, and once-and-only-once delivery. More details about publish and subscribe operations are provided below.

Publish and Subscribe Functionality

Figure 4:
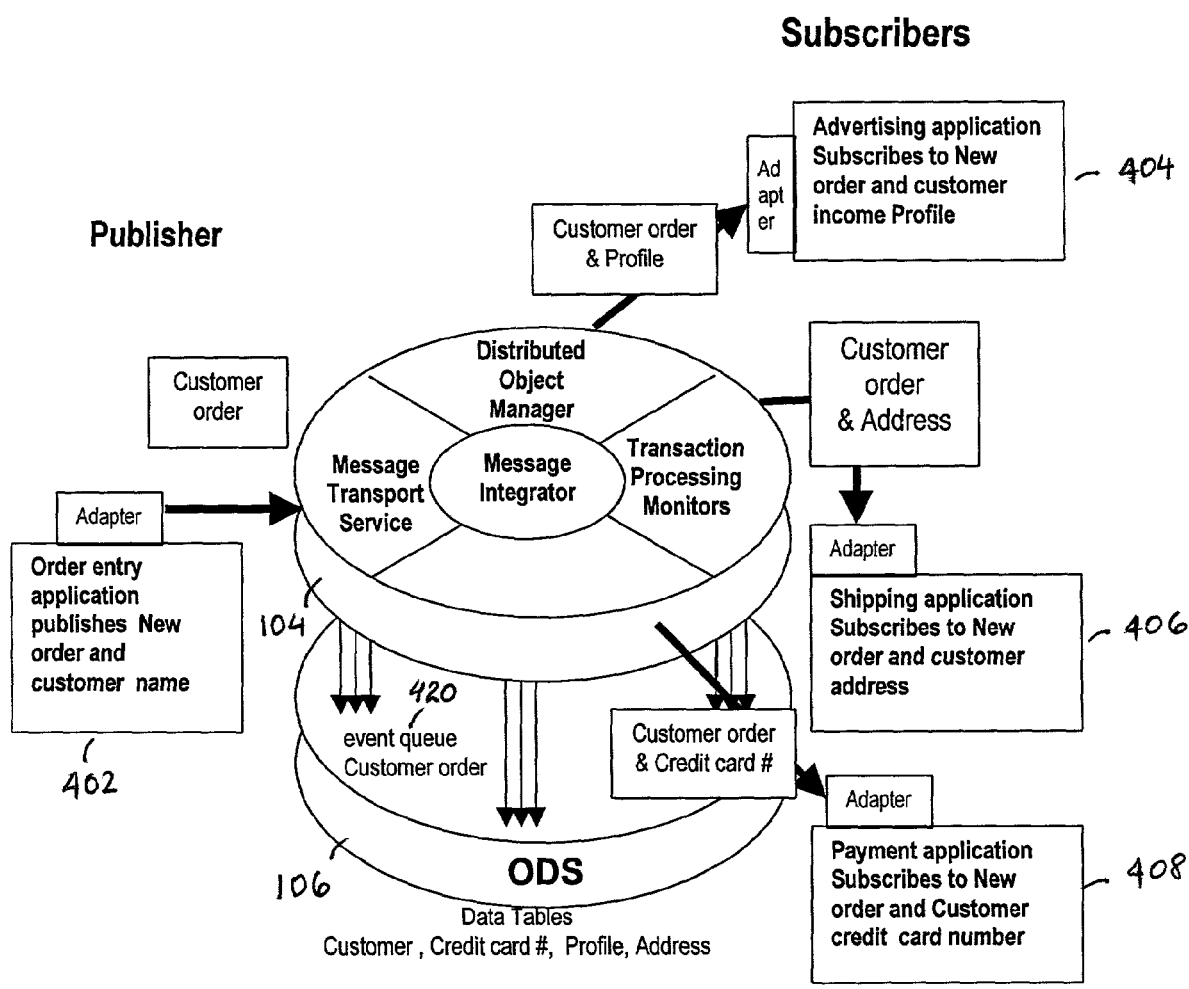
FIG. 4 illustrates a ZLE framework configured from publish and subscribe operations

In the ZLE framework, EAI tools typically perform message functions, while database and application servers are in charge of transaction and data functions. The ZLE framework merges both, as well as other functions that are unique to the ZLE framework and support the enterprise business. FIG. 4 illustrates the ZLE framework configuration for publish and subscribe operations.

As shown, for message publishing (pushing to ODS) and message subscription (pulling from ODS and dissemination), the RDBMS caches and queues messages (420) for subscribers (relating for example, to specific events and their results). Data can be published by an application (e.g., 402) to the ODS 106 for formatting and insertion into a database table. For example, data can be published to the ODS in an XML message (XML stands for extensible Markup Language). The data can then be routed out of the ODS to multiple subscriber applications (e.g., 404, 406, 408). In this way, the innate parallelism, scalability, and reliability of the database can be leverages, along with its management capabilities, to ensure an efficient flow of subscriber messages. Of course, the current information contained in the database tables is also available for ad hoc querying or for bulk shipment to analytic applications, data marts, and so on.

It is noted that other publish and subscribe products on the market contain a data store for the queues, but they are not relational. And, unlike the ZLE architecture, they do not allow the end user to access these data stores through standard SQL syntax or with transactional integrity.

The ZLE core-based publish and subscribe operations involve the EAI platform. Publish and subscribe operations are responsive to applications that subscribe to the ZLE framework. Subscribing applications ask for specific information whenever certain business events occur. These applications could be Web server, call center, or fraud detection applications in search of changes in a consumer's credit status; or they could be electronic catalog or supply chain applications dependent on receiving the most current inventory status. When events occur, an adapter publishes the change to the ZLE framework. The appropriate ZLE core service then formats the messages correctly and pushes them to the subscribing applications, where they are filtered through the application adapters.

Enriched Publish and Subscribe

In accordance with the present invention, the ZLE architecture combines enterprise integration technologies with operational data store and decision support to enable access of the enterprise to the information in real time across the enterprise, and to turn it into knowledge that can be used for improving business processes.

Notably, the ability of the ODS to cache data can be used to enrich the messages—i.e., for request response or publish subscribe—that pass through the ZLE framework. For example, the response to a request for "last customer transaction" can be enriched by change of address or change of marital status information contained in the ODS as the response flows through the framework. Similarly, information cached in the ODS for distribution to subscribers can pick up additional data that has been cached there by other applications. For example, a business-to-business customer wants to make an online purchase. As the ZLE architecture pulls together current inventory and pricing information, it can enrich it with personalized customer-specific data from its data store regarding special offers on related products—information that is invisible to the inventory system. ZLE enriched publish and subscribe is further explained below.

Figure 5:
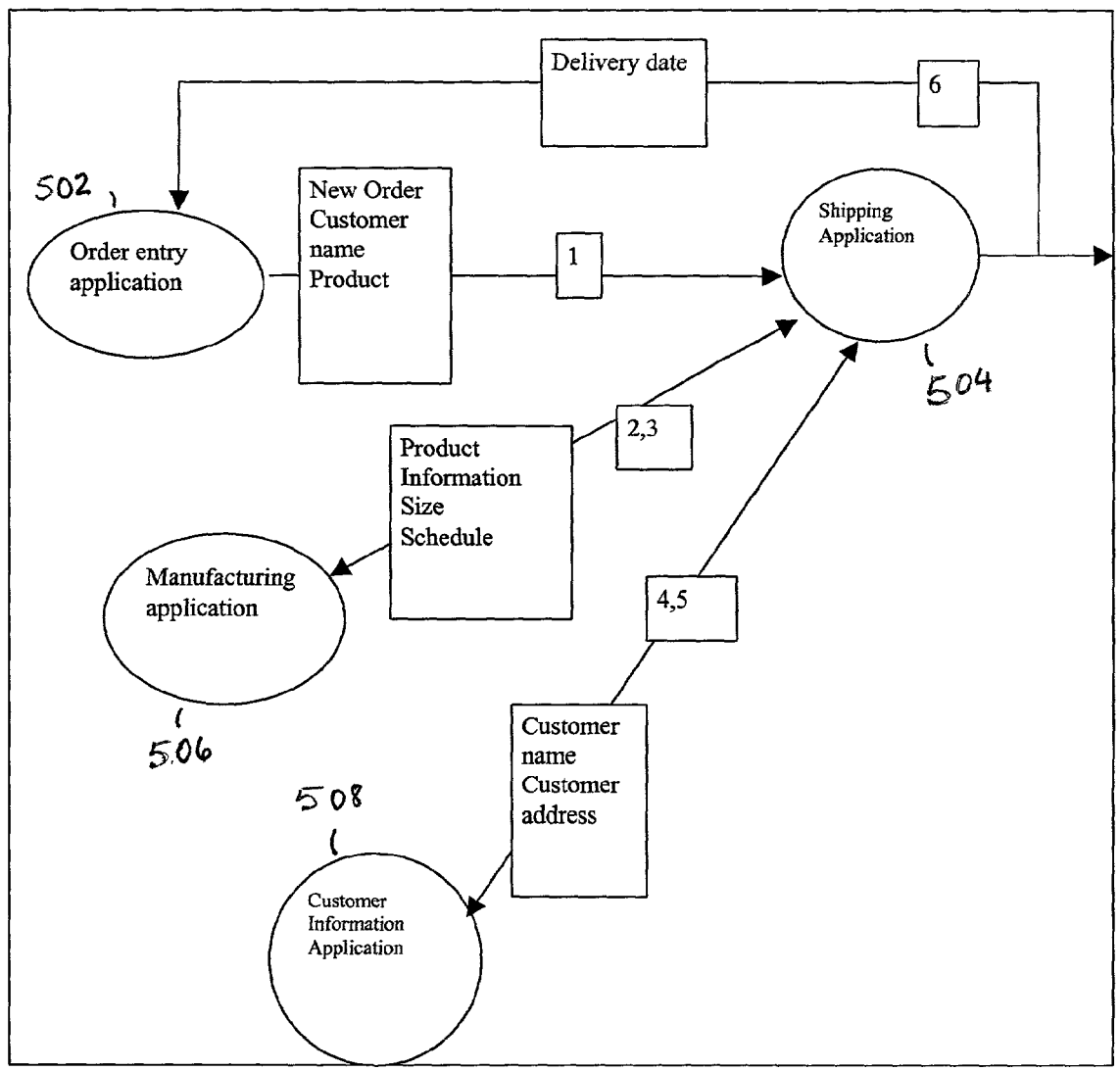
FIG. 5 illustrates integration through messaging system middleware by which messages are exchanged between legacy applications.

Previously, in an enterprise application integration environment multiple systems with different business applications have been integrated through a messaging system middleware (MOM). The idea being that when a business event happens in one application a message is sent to other applications that are affected by this business event, so they can take the necessary action and the result will be an integrated enterprise. FIG. 5 illustrates how such approach would have been implemented.

The example of FIG. 5 involves enterprise applications that handle product ordering, manufacturing and shipping. The enterprise applications, such as the order entry and shipping applications, may be older applications that cannot exceed their earlier-designed capacity to match newer applications (hence such applications are collectively referred to as the "legacy" applications, although legacy could refer to any application that is present in the system). As shown, when an order entry application receives an order (i.e., a customer order), it sends a message to a shipping application so that the ordered product can be scheduled for shipment. The message includes for example an order number, customer name and the name of the product to be shipped. However, when a new order arrives from a customer to the legacy applications, these applications may not have enough information to accomplish their task. In this example, the shipping application may need to know about product size and availability, before it can schedule shipping of the ordered product. The shipping application may also need more information about the customer, such as his credit worthiness or his address before it can schedule shipment of the product. The shipping application may need to send the result of its planning back to the order entry application and customer support application so that these applications can, in turn, inform the customer as to when the product will be shipped. Hence, this scheme creates multiple messages to the legacy system, and puts stress on some of the legacy application by repeatedly asking the same type of information, every time a new order arrives.

More specifically, the process starts when an order entry application 502 receives a new order. The order can be received through a phone, POS (point of sale terminal), or WEB (world wide web). Then, an application adapter creates a message (1) with the customer name, order, and product name and sends the message to the shipping application 504 directly or through an EAI broker hub. After receiving the message, the shipping application adapter realizes that it needs few more information before it can complete the transaction and schedule the ordered product for shipping. The needed information may include customer address, product size, and product availability. The shipping application adapter creates a new message (2) requesting information about the product availability and size, and sends this message to a manufacturing application directly or through the EAI broker hub. After receiving the response (3) to its first request, the shipping application creates a new information request to customer information application 508, asking for customer address (4). Next, after receiving this information (5), the shipping application 504 schedules the product to be shipped, and informs the order entry application 502 of the product shipment date (6).

It can be understood from the above that such a scheme is inefficient. Every new order or business event creates multiple messages across the enterprise integration hub, and legacy applications. The frequent and multiple messages, impose too many information requests on these applications, which are already overloaded as it is. After each transaction is done, some of the legacy applications, such as manufacturing or customer information applications, have no knowledge if the transaction was carried out to a successful completion or not. Moreover, information is still scattered and can not be used for analysis to streamline business processes.

Hence, although the ZLE framework as described above supports message oriented middleware (MOM), its message routing capability differs from the foregoing scheme of routing and queuing messages that are moved from application to application. Indeed, with the approach in accordance with the present invention, by comparison to the conventional scheme, the number of information requests to the legacy system (including legacy applications and native core services), can be reduced and the overloading of the legacy system can be avoided.

In an enterprise running as a ZLE, by comparison to the above example, when an order (business event) arrives at the ZLE core (or ZLE hub), and a message is sent to the shipping application, the shipping application does not need to create multiple requests and responses to other applications. Rather, it will subscribe or send a message only to the ZLE hub for information about product size and availability. Since the information is already cached in an operational data store (ODS) hub, the ZLE hub is in a position to respond to the request directly.

The shipping application then asks the ZLE hub for information about the customer address. The ZLE hub will provide that piece of information without the need to also ask another application. This information is cached in the ZLE hub whenever the customer interacts with the enterprise for the first time or whenever this information is subsequently changed.

With this architecture, the load on legacy applications is drastically reduced since the information is provided directly from the ODS at the ZLE hub and not from the legacy applications. The legacy applications update the information at the ODS on their own time, and only when some of the information in their environment changes, such as when a customer calls to change a home address.

As noted before, previous enterprise integration technologies are based on messages, and they do not keep a cache of the information. In addition, enterprise integration technologies, do not provide the opportunity to enrich business events information with multiple pieces of necessary information. Therefore, with MOM technologies messages requesting the same information from legacy applications are sent over and over again.

One of the notable advantages of the present invention is providing for such deficiencies. Indeed, a system with the ZLE enriched publishing and subscription capability requires, by comparison, reduced exchange of messages through the enterprise infrastructure. Namely, fewer messages are required for obtaining up-to-date enterprise business activity information necessary for taking an action. And, the legacy applications are kept informed with up-to-date information without having to exchange numerous requests (messages) among applications for extra information.

Since this invention reduces the number of messages required for carrying information among multiple applications, it also reduces the number of messages that are passed through the enterprise infrastructure. This scheme not only reduces messages even when the ODS in the ZLE hub is present. It also ensures that the information delivered to a given application reflects the up-to-date status of the information at that point in time. Thus, this scheme provides control over business events and transactional integrity.

The foregoing is accomplished by gathering enough information at the ZLE hub (ODS), and then defining the information that should be send to the legacy applications based on the set of events. The ZLE hub can minimize the number of messages by enriching the first message of each new order event (equivalent of message 1 in FIG. 4) with all of the information that the legacy applications need to complete their task. In the example above the order entry application sends a message about the new order to the ZLE hub (also shown in FIGS. 5 and 6). The ZLE hub is pre-configured to know what sets of information the shipping application needs in order to complete its task. Hence, before sending the order message to the shipping application in response to an order event, the ZLE hub enriches the order message with the customer address, product size and availability information. In this way, the number of messages across the enterprise is reduced to half. Furthermore, there is no load imposed on applications that were not taking part in the transactions.

Figure 6:
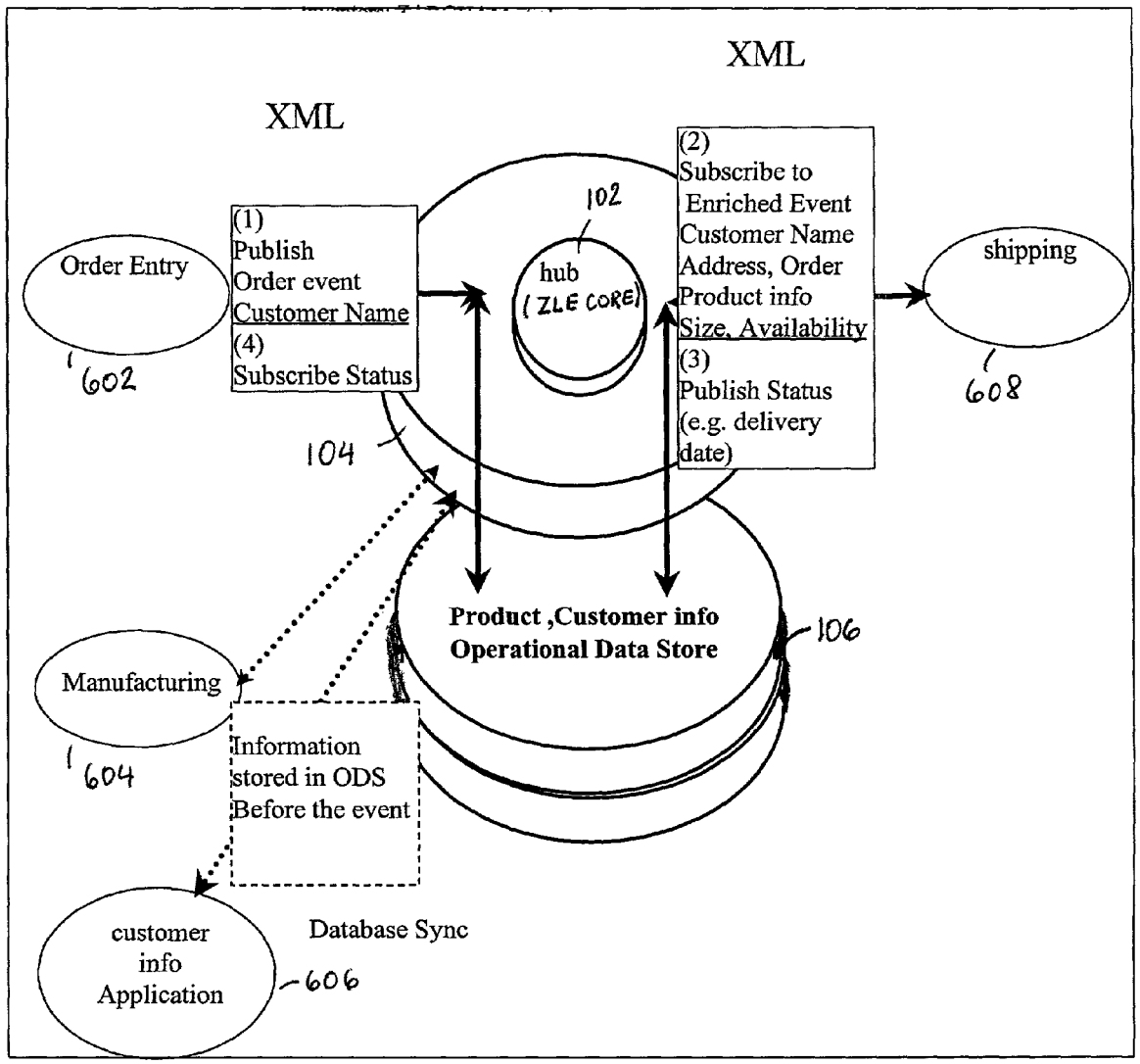
FIG. 6 illustrates the enriched publish and subscribe operations.

To illustrate these advantages, when an order is processed in a ZLE enriched system the process flow is shown in FIG. 6 and detailed below. The order entry application 602 receives a new order through the phone, POS, or WEB. An application adapter creates a message with customer name, order, and product name and publishes the message to the ZLE hub (1). The ODS 106 warehouses information it obtained from the customer information application 606 before the event. Upon receiving the new message (1), The ZLE hub 102 updates its ODS 106 with the new order event. The ZLE hub creates a message (2) with the new order, the customer name and address, and the product size and availability, and sends this message to the shipping application 608. With this (enriched) information, the shipping application can complete the transaction, schedule shipping, and publish the status to the ZLE hub (3). Then, the ZLE hub 102 returns the status to the order entry application (4).

As this example illustrates, by enriching the business events at the ZLE hub, it is possible to decrease the number of message, and also deliver the information in a more timely manner to its destination. In this example the number of messages was reduced from 6 to 4. In a more complex environment when there are N number of applications involved the number of messages can be reduced from 2N to 4 or 5 messages.

As mentioned, the ZLE architecture includes ODS based on a scaleable database that is capable of performing mixed work load (as shown in FIGS. 4 and 6). This platform supports priority, first-in/first-out, guaranteed, and once-and-only-once delivery. It can update the database with transactional events with quality of service (grandee response time), while querying the database. This guarantees timely and ordered delivery of enriched messages to the subscribing application.

To give meaning to events, each legacy application preferably defines an XML (extensible markup language) schema that identifies the business events or type of data changes in which it is interested. As part of this schema the legacy application also defines the rest of the information that it needs in order to complete its task when a business event happens. The legacy application then registers this request with a ZLE enriched publish-subscribe service provider module. The ZLE enriched publish-subscribe service provider module stores this schema in the operational data store. When a new business event such as a new order arrives at the ZLE, the ZLE hub writes this information into the operational data store. This action in turn triggers an indication that some applications are subscribing to that event. With this capacity, the ZLE hub creates XML messages with all the necessary information that the legacy applications defined in its subscription schema. Then the ZLE hub forwards these enriched message events to the legacy applications that had subscribed to that event. Each subscriber receives a specific message that has all the information that it needs to finish its task.

Thus the present invention can create a new standard way for applications to publish and subscribe with enriched information. Alternatively, ZLE can use standard products to create an extra value by aggregating some of these capabilities. That is, standard products can be aggregated with XML schemas for defining information requests and subscriptions by the applications and with an operational data store based on a relation database for storage of these schemas. The messages can get to legacy application adapters over any transport mechanism including Corba, Soap or MQ series.

In Summarry

The present invention contemplates a ZLE framework that keeps information from myriad enterprise systems refreshed, ready for consolidation, and available for real-time deployment in decision-making, CRM, inventory management, and marketing campaigns based on a unified view of customer interactions data and of the consolidated state of the various enterprise operations. The ZLE framework realizes this vision by creating an amalgamation of many functions to fashion hybrid functionality. This hybrid functionality allows the combining and hot-caching of information from across the enterprise in real time, as well as providing uniform rule-driven, workflow-informed architecture for the flow of information and breaking down performance dependencies between applications. This hybrid functionality also enables new types of applications that could not exist without real-time data and application integration.

In an IT infrastructure configured with the ZLE framework including publish and subscribe capability as provided by the present invention, the information is provided directly from the ODS at the ZLE hub and not from the applications. The applications update the information at the ODS on their own time, and only when some of the information in their environment changes. Publish and subscribe operations provide the opportunity to enrich business events information with multiple pieces of necessary information. A system with the ZLE enriched publishing and subscription capability requires, by comparison, reduced exchange of messages through the enterprise infrastructure for informing applications with up-to-date information.

Finally, the ZLE framework is designed to leverage best-of-the-breed tools into customized, integrated solutions for applications and data integration. The ability of the ZLE architecture to perform different types of functions and process different workloads in parallel and around the clock (24×365), without the need for maintenance downtime—with the added functionality of clip-on applications from best-of-the-breed ISVs—is what unleashes the incredible business potential of any ZLE that builds the ZLE framework into their IT infrastructure.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only, with a true scope of the invention being indicated by the following claims and equivalents.

What is claimed is:

1. A method for enriched publish and subscribe in an enterprise running as a zero latency enterprise (ZLE), the enterprise experiencing a plurality of events occurring in association with business transactions conducted at a plurality of sites across the enterprise, the method comprising:
    initiating, by a computer, in real time, a process responsive to an event, the process including publishing, by a computer, to a central repository one or more messages prompted by that event containing information from that even, respective information from the plurality of events being aggregated in the central repository where the aggregated information can, in real -time, be accessible and available for extraction and analysis from across the enterprise,
    updating the aggregated information with information from the published messages,
    creating enriched messages by enriching the messages with information from that event and/or corresponding information extracted from the central repository, and
    subscribing the enriched messages.

2. A method as in claim 1, wherein the central repository operates as an information broker between applications such that applications publish messages to the central repository and subscribe to messages from the central, rather than exchange request-response messages directly with each other.

3. A method as in claim 2, wherein for a particular number (N) of applications, a combined number of the published and subscribed messages can be reduced from twice that particular number (2N) to a total number of 4 or 5 messages.

4. A method as in claim 2, further comprising:
    predefining a schema for each of the applications, the schema identifying which of the plurality of events and types of data changes its respective application is interested in, the schema further identifying any information its respective application needs for performing tasks related to such events; and
    storing each schema in the central repository for later use in enriching the new messages.

5. A method as in claim 2, wherein the applications cause the updating of aggregated information at the central repository upon a change of information in their environment.

6. A method as in claim 1, wherein the central repository provides a coherent view, in real time, of the aggregated information from across the enterprise, the process being founded on the coherent view of the aggregated information.

7. A method as in claim 1, wherein the published messages and subscribed messages are formatted in XML.

8. A method as in claim 1, wherein the central repository is based on a database which can be updated with information from new events while being queried and which can send the enriched messages to multiple subscribers, thereby leveraging an innate parallelism, scalability and reliability of the database.

9. A method as in claim 1, wherein the central repository includes relational database management functionality that caches and queues the published and subscribed messages.

10. A method as in claim 1, wherein the enriched new messages to which an application subscribes can include extracted information that was previously published to the central repository by other one or more applications.

11. A method as in claim 1, where the corresponding information is mined and/or analyzed in real time.

12. A system comprising a processor for enriched publish and subscribe in an enterprise running as a zero latency enterprise (ZLE), the enterprise experiencing a plurality of events occurring in association with business transactions conducted at a plurality of sites across the enterprise, the system comprising:
    means for initiating, in real time, a process responsive to an event, the process including
    means for publishing to a central repository one or more messages prompted by that event containing information from that even, respective information from the plurality of events being aggregated in the central repository where the aggregated information can, in real-time, be accessible and available for extraction and analysis from across the enterprise,
    means for updating the aggregated information with information from the published messages,
    means for creating enriched messages by enriching the messages with information from that event and/or corresponding information extracted from the central repository, and
    means for subscribing the enriched messages.

13. A system as in claim 12, wherein the central repository operates as an information broker between applications such that applications publish messages to the central repository and subscribe to messages from the central, rather than exchange request-response messages directly with each other.

14. A system as in claim 12, wherein the central repository is based on a database which can be updated with information from new events while being queried and which can send the enriched messages to multiple subscribers, thereby leveraging an innate parallelism, scalability and reliability of the database.

15. A method as in claim 12, wherein the central repository includes relational database management functionality that caches and queues the published and subscribed messages.

16. A computer readable storage medium embodying computer program code configured to cause a computer to performs steps for providing enriched publish and subscribe in an enterprise running as a zero latency enterprise (ZLE), the enterprise experiencing a plurality of events occurring in association with business transactions conducted at a plurality of sites across the enterprise, the method comprising:
    initiating, in real time, a process responsive to an event, the process including publishing to a central repository one or more messages prompted by that event containing information from that even, respective information from the plurality of events being aggregated in the central repository where the aggregated information can, in real-time, be accessible and available for extraction and analysis from across the enterprise, updating the aggregated information with information from the published messages, creating enriched messages by enriching the messages with information from that event and/or corresponding information extracted from the central repository, and subscribing the enriched messages.

* * * * *

UNITED STATES PATENT AND TRADEMARK OFFICE
CERTIFICATE OF CORRECTION

PATENT NO.        : 7,856,420 B2                                     Page 1 of 1
APPLICATION NO.   : 10/013091
DATED             : December 21, 2010
INVENTOR(S)       : Bahman Zargham et al.

It is certified that error appears in the above-identified patent and that said Letters Patent is hereby corrected as shown below:

Column 19, line 32, Claim 1, delete "even" and insert -- event, --, therefor.

Column 19, line 34, Claim 1, delete "real -time," and insert -- real-time, --, therefor.

Column 20, line 20, Claim 12, delete "for enriched" and insert -- for providing enriched --, therefor.

Column 20, line 27, Claim 12, delete "event, the" and insert -- event, the means for initiating the --, therefor.

Column 20, line 30, Claim 12, delete "even," and insert -- event, --, therefor.

Column 20, lines 58-59, Claim 16, delete "performs" and insert -- perform --, therefor.

Column 20, line 63, Claim 16, delete "method" and insert -- steps --, therefor.

Column 20, line 65, Claim 16, delete "including publishing" and insert -- including the steps of publishing --, therefor.

Column 20, line 67, Claim 16, delete "even," and insert -- event, --, therefor.

Column 22, line 1, Claim 16, delete "enriched" and insert -- an enriched --, therefor.

Signed and Sealed this
Seventeenth Day of April, 2012

David J. Kappos
*Director of the United States Patent and Trademark Office*